A. C. PRATT.
APPARATUS FOR MAKING GROMMETS.
APPLICATION FILED FEB. 14, 1920.

1,414,828.

Patented May 2, 1922.
4 SHEETS—SHEET 1.

Inventor
Alphonso Comstock Pratt
By his Attorneys
Pennie Davis Marvin & Edmonds

A. C. PRATT.
APPARATUS FOR MAKING GROMMETS.
APPLICATION FILED FEB. 14, 1920.

1,414,828.

Patented May 2, 1922.
4 SHEETS—SHEET 3.

UNITED STATES PATENT OFFICE.

ALPHONSO COMSTOCK PRATT, OF ERIE, PENNSYLVANIA.

APPARATUS FOR MAKING GROMMETS.

1,414,828.  Specification of Letters Patent.  Patented May 2, 1922.

Application filed February 14, 1920. Serial No. 358,790.

*To all whom it may concern:*

Be it known that I, ALPHONSO COMSTOCK PRATT, a citizen of the United States, residing at Erie, in the county of Erie, State of Pennsylvania, have invented certain new and useful Improvements in Apparatus for Making Grommets; and I do hereby declare the following to be a full, clear, and exact description of the invention, such as will enable others skilled in the art to which it appertains to make and use the same.

This invention relates to machines for making grommets of the type commonly used in tires for automobiles and bicycles, particularly automobile tires of the so-called straight side type. Such a grommet preferably consists of a steel hoop made from a single continuous piece of wire and having a plurality of convolutions of spirals laid side by side upon a core, the spirals being formed from the intermediate portion of the piece of wire and the two end portions of the piece of wire forming the core.

Patent No. 1294160 granted to me February 11, 1919, discloses a method and apparatus for making such a grommet characterized by the fact that in making the convolutions of spirals, the wire is given a spiral formation before it is applied to the grommet. This is done by forcing the wire through a quill or die having a spiral passage therethrough and rotating this die about the axis of the grommet being made, so that the wire is first spiraled and is then laid in place upon the grommet. I have also devised a machine for making such grommets under tension, that is, by moving the partially completed grommet around by power driven devices and thus causing it to draw wire off from a reel under tension while the reel is being rotated about the grommet. A machine for manufacturing grommets in this way is disclosed in Patent No. 1327170 granted to me on January 6, 1920.

The present invention relates to a machine of the latter type whereby grommets are made under tension, the wire for the convolutions of spirals being given its spiral formation as an incident to the application of the wire to the partially completed grommet; it constitutes an improvement upon the machine of Patent 1327170. In the machine of that patent the partially completed grommet is moved around upon its support during the operation of making the grommet by feed rollers which grip the partially completed grommet between them and by feeding it along cause it to draw wire off from the supply reel which is rotated about the axis of the grommet. One of the important features of the present invention is the provision of means for effecting the feed of the grommet around upon its support during the progress of the operation of making the grommet whereby the wire for the convolutions of spirals is drawn off from the supply reel as the latter is rotated. The improved feeding means consists of a leader or traveler to which the end of the piece of wire for the grommet is secured and which is caused to move around upon a suitable support, carrying the wire with it through several convolutions, thus building up a grommet of the required number of convolutions. The wire for the grommet is supplied from a reel carried by a shuttle which is adapted to rotate in correspondence with the movement of the leader or carrier. During the first movement of the leader completely around the support for the grommet, the supply of wire is not rotated and therefore this first convolution of wire drawn off from the supply reel is straight wire adapted to constitute the core of the grommet. When the leader or traveler has moved around its circular path once, the shuttle carrying the reel of wire is rotated in correspondence with the travel of the leader, thus rotating the supply of wire about the first convolution which constitutes the core. This results in winding wire spirally under tension upon the core and this winding operation continues uninterruptedly until the desired number, say six convolutions of spirals, have been wound upon the core wire with the spirals of the several convolutions lying side by side. It will be appreciated that operation in this manner requires that the traveler shall cross the path of movement of the shuttle carrying the supply reel and special provision must therefore be made to permit this. The circular support for the grommet being made and the circular bed upon which the leader or traveler moves must have gaps in them to permit the wire for the convolutions of spirals to be carried around the wire constituting the core and preferably to allow for the passage of a tubular guide through which the wire passes. These gaps should be made as narrow as possible and as the tubular guide for the wire would pass through the gap in considerably less than one-quarter of a revolution of the shuttle; the period of the remainder of that revolution of the shuttle is available for moving the traveler or leader across the gap in its circular support. By reducing the width of the leader and the width of the gap as much as possible and providing suitable means for moving the leader across the gap, this movement can be readily effected within the allowable time period without necessitating the use of a larger pitch of the spirals for the grommet than is desired.

The features of the present invention will be better understood by reference to the following description taken in connection with the accompanying drawings which show constructions in which the invention may be embodied. In these drawings

Figure 1:
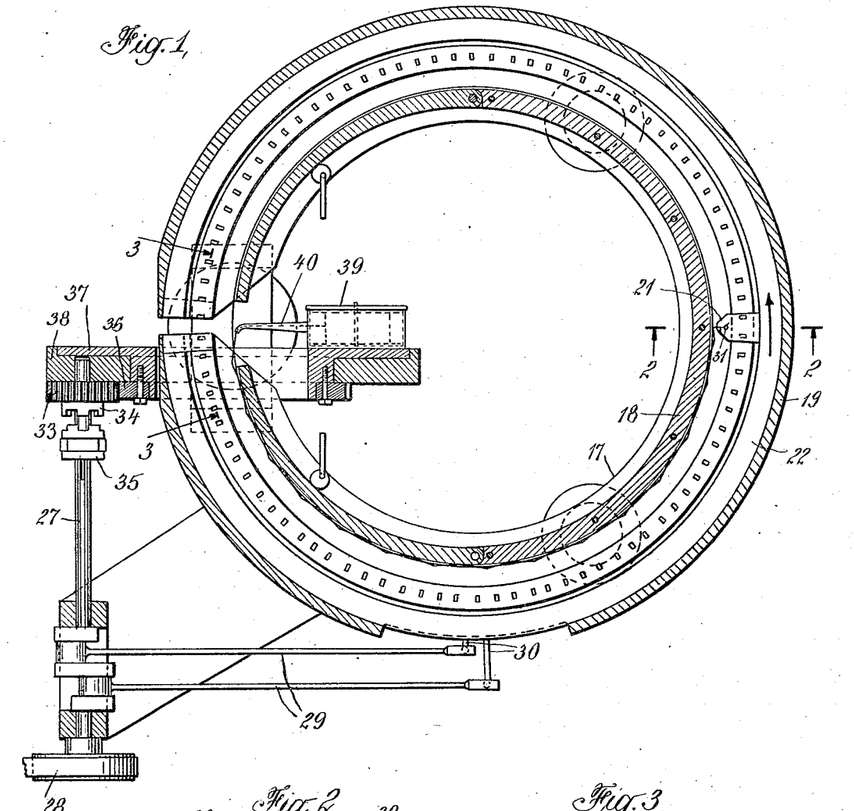
Fig. 1 is a horizontal sectional view of a machine constructed in accordance with the present invention.
Figure 2:
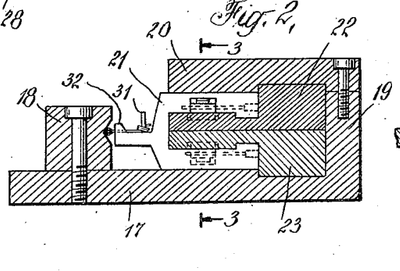
Figs. 2 and 3 are detail views in vertical section on lines 2—2 and 3—3 respectively of Fig. 1.
Figure 3:
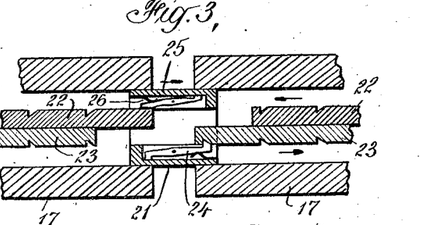

Referring first to Figs. 1 to 4 inclusive, a frame plate of circular form is shown at 17. This constitutes the base plate of the machine and it is supported on suitable pillars rising from the floor as indicated in Fig. 1. This plate 17 forms a complete circle except for a narrow gap at one point as shown in Fig. 1. Mounted on this base plate 17 is a wall 18 which is circular in form except that it is interrupted at the gap in the base plate. On the outer side of this circular wall is a groove or depression, preferably V-shaped in cross section, which forms the support in which the grommet is built up, as shown in Fig. 2. At the outer edge of the base plate 17 is an upright wall 19 and to this is secured a top plate 20. The three parts 17, 19 and 20 form a housing of annular form except for the narrow interruption or gap therein and a traveler or leader 21 is adapted to move around the circular path within this housing. Any suitable means may be employed for causing the traveler or leader to move steadily around the circular path within the housing and across the gap therein the required number of revolutions. In Figs. 1 to 4 I have shown the leader as moved by ratchet and pawl mechanism. This includes two circular pieces 22 and 23 lying one on top of another within the housing formed by the parts 17, 19 and 20. These two parts 22 and 23 are complete rings except for interruptions or gaps in them corresponding to the gaps in the base plate 17 and wall 18, though of slightly greater width. The parts 22 and 23 are made to oscillate about their axis and for this purpose are received in suitable guides within the housing and each of the parts is provided with a tongue which enters a correspondingly shaped recess in the leader 21. On the non-adjacent faces of the flanges or projections of the parts 22 and 23 are notches regularly spaced throughout the length of the pieces and adapted to receive pawls carried by the traveler 21. These pawls are shown at 24 and 25 in Fig. 3 and it will be noted that each pawl is provided with a spring 26 for turning the pawl on its pivot to carry its end into a notch on one of the plates 22 and 23. These two plates 22 and 23 are reciprocated from a power shaft 27 which is mounted in suitable bearings and driven from any suitable source of power 28. The shaft 27 is shown as provided with two cranks from which connecting rods 29 lead to pins 30 projecting from the plates 22 and 23. As the cranks on the shaft 27 are oppositely directed, the plates 22 and 23 are reciprocated in opposite directions simultaneously.

The leader 21 is provided with means for attaching the end of a piece of wire thereto. This may consist of a pin as shown at 31 and preferably the leader has a projection 32 thereon around which the wire passes. The leader is of such size that this projection 32 passes close to the outer face of the wall 18.

Figure 4:
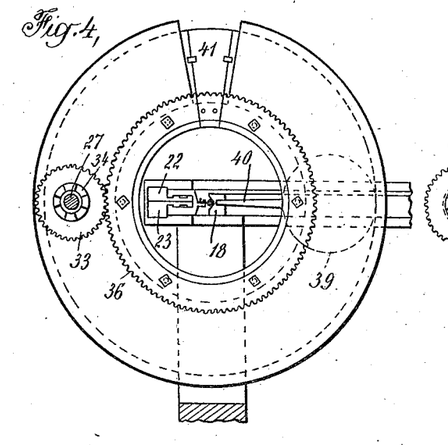
Fig. 4 is a face view of the shuttle shown in Fig. 1.

Loosely mounted on the shaft 27 is a pinion 33 provided with clutch teeth 34. A clutch member 35 is splined on the shaft 27 to adapt it for movement into engagement with the clutch member 34 and thereby connect the pinion 33 to the shaft 27. This pinion 33 meshes with a gear 36 which is secured to a ring-shaped shuttle 37 adapted to rotate in a stationary ring 38. The shuttle 37 carries a reel of wire mounted within a housing 39 which is secured to the shuttle 37. Projecting from this housing is a tubular guide 40 which preferably extends down close to the axis of the shuttle. The ring 38 in which the shuttle is mounted is preferably cut away over a short space at its upper side as shown in Fig. 4 and preferably the shuttle is provided with a removable section 41 such that when the operation of making a grommet has been completed the grommet may be removed from the machine.

With the machine constructed as illustrated in Figs. 1 to 4, the direction of movement of the leader 21 is that indicated by the arrow on Fig. 1 and operation of the machine starts with the clutch member 35 out of engagement with the clutch member 34 and the leader or traveler 21 just past the gap in the frame plate.

The piece of wire carried by the reel in the housing 39 is brought down through the tubular guide 40 and around the projection 32 on the traveler and its end is secured to the pin 31 on the traveler. The rotation of shaft 27 is then started but the shuttle 37 does not rotate on account of the disengagement of the clutch members 34 and 35. The two annular plates 22 and 23 are reciprocated by the cranks 29 and by their reciprocation they cause the traveler 21 to move around steadily over its circular path. As the two plates 22 and 23 are reciprocated simultaneously in opposite directions, each of them carries the traveler with it on alternate reciprocations and the movement of the traveler is practically continuous. If desired, three plates instead of two could be employed, the third one lying between the other two and notched to receive a pawl on the traveler and then the movement of the traveler would be wholly uninterrupted.

As the traveler moves around in its circular path, it draws wire off from the reel in the housing 39 through the tube 40 and lays that wire in the groove in the wall 18. As the traveler completes its first trip around the circular support, it comes to the gap. As the upper plate 22 moves to the right in Fig. 3, it carries the traveler out into the gap. When the plate 22 effects that movement, the plate 23 moves to the left and at the end of this movement the pawl 24 at the bottom of the traveler enters a notch in the lower plate 23. Then when the two plates 22 and 23 move in the opposite directions it is the lower plate 23 which carries the traveler with it across the gap while the other plate 22 disengages the upper pawl 25 of the traveler and moves independently of it.

Immediately after the traveler crosses the gap in the base plate 17, the clutch member 35 is thrown into engagement with the member 34 either manually or automatically and as a result the shuttle 37 begins to rotate in correspondence with the movement of the traveler around its circular path. By this rotation of the shuttle, the supply of wire and the tube 40 are rotated about the axis of the grommet being formed and as this occurs the traveler is moved around on its support and draws with it the wire which has been laid in the groove in the supporting wall 18. Thus the grommet being made, consisting first of one convolution of wire, is moved around upon its circular support, drawing off wire from the supply while that supply is being rotated about the axis of the grommet, and as a result the wire drawn off from the supply is wound spirally under tension upon the core. Fig. 1 represents the parts after the traveler has traveled one and one-half times about its circular path. During the first travel it laid straight wire in the groove in the wall 18 and in the succeeding half revolution wire was spiraled upon this core. In the further operation the convolution of spirals wound on the core will be completed and the requisite number of additional convolutions will be wound spirally on the core with the spirals of the several convolutions lying side by side.

The gearing connecting the shaft 27 to the parts driven thereby may be such that the plates 22 and 23 make three reciprocations for each revolution of the shuttle. The reciprocation of the plates 22 and 23 is so timed with respect to the rotation of the shuttle 37 that the tubular guide 40 for the wire passes through the gap or interruption in the base plate 17 when the ends of the plates 22 and 23 do not overlap the side walls of the gap in the frame plate. The passage of the tubular guide 40 through this gap is completed in less than 90° of rotation of the shuttle and the remainder of the angular movement of the shuttle is quite sufficient for the completion of the movements of the parts incident to carrying the leader across the gap in the frame plate.

After the leader has made a number of complete excursions around its circular path corresponding to the core and the number of convolutions of spirals desired, the clutch members 34 and 35 are thrown out of engagement to discontinue the rotation of the shuttle and further movement of the leader accompanied by movement of the grommet as a whole around upon its support causes a piece of straight wire to be drawn off from the reel. The piece of straight wire so provided may be equal to one-half the circumference of the grommet. The machine is then brought to rest and the partially completed grommet is taken out. Then a portion of the core of the grommet may be removed by spreading the overlapping spirals and cutting the core wire and the core may then be completed with the wire of the extra length of straight wire drawn off from the reel after the completion of the convolutions of spirals. This piece of straight wire after being cut to the proper length may be readily inserted in position within the spirals by applying pressure to it to force it into the space within the grommet.

In Figs. 6 to 9 of the drawing I have illustrated a form of my invention in which an endless chain is substituted for the traveler to rotate the grommet and to support it as it is being formed. In this form of my invention a base plate 41 of circular form is supported on pillars 42, the base plate being continuous except for a narrow gap as shown in Fig. 5. Supported on the base plate is a circular frame 43, one end of which is pivoted at 44 and held in place by an eccentric 45. The eccentric 45 is supported on the base plate 41 and may be rotated by means of a handle 46 to release the tension on an endless chain 47 which encircles the frame 43, being supported adjacent the gap by sprockets 48. A bracket 49 on the frame 41 provides an adjustable support for a shaft 50 carrying a sprocket 51 about which the chain 47 is disposed and whereby it is actuated from suitable driving means connected to the shaft 50. The chain 47 is thus caused to travel about the frame 43 and thence over the sprocket 51 so that a continuously advancing carrier is provided on the base plate which nevertheless does not interfere with the gap therein.

The chain 47 comprises links 52 and 53, the latter having V-shaped faces 54 forming a groove in which the core of the grommet is laid and the grommet remains during the winding of wire on the core. Preferably, each of the links 53 is provided with an opening 55 in which the bent end of the wire may be disposed during the primary operation of forming the core. After the core is formed and the winding of the convolutions has commenced, the frictional engagement of the wire with the links 53 is sufficient to advance the grommet with the chain. The grommet being thus rotated, my invention contemplates disengagement of the bent end of the wire from the opening 55 in the link after a single revolution of that link and when it passes the sprocket 48 at one side of the gap. This disengagement of the bent end of the wire from the opening prevents movement of the wire with the chain about the sprocket 51.

Figures 5, 7, 8, 9:
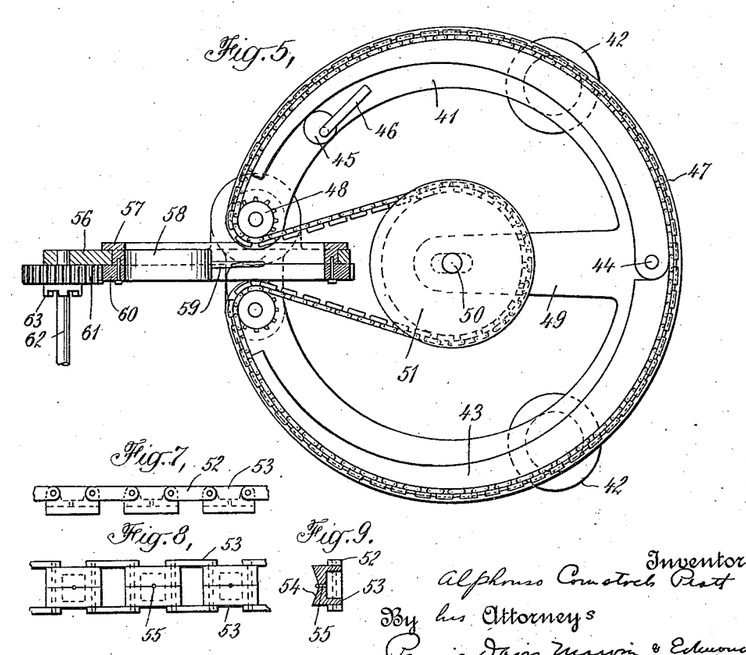
Fig. 5 is a view corresponding to Fig. 1 illustrating a modified construction.
Figs. 7, 8 and 9 are detailed views of the chain shown in Fig. 5.
Figure 6:
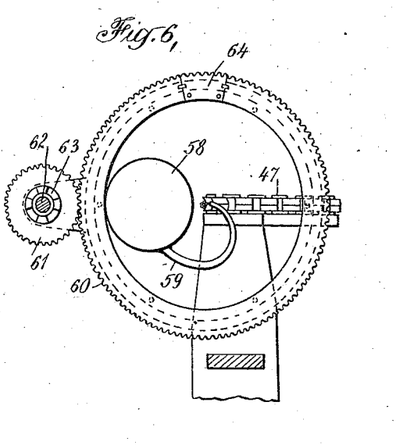
Fig. 6 is a detail view of the shuttle shown in Fig. 5.

Adjacent the gap in the base plate 41, I provide a ring 56 to support a shuttle 57 which, in turn, carries a wire reel 58. Wire is delivered from the reel 58 through a tubular guide 59, the end of which is disposed closely adjacent the circle described by the chain 47 and between the ends of the base plate 41. A gear 60 is secured to the shuttle 57 and meshes with a pinion 61 loosely supported on a shaft 62 which has a bearing in the ring 56. The pinion 61 is provided with clutch teeth 63 which are adapted to be engaged by a clutch (not shown) and corresponding to the clutch 37 illustrated in Fig. 1. The clutch being splined to the shaft causes rotation of the gear 60 and consequently of the shuttle when moved into engagement with the clutch teeth 63. The shaft 62 may be driven from any suitable source of power.

In forming a grommet on the machine illustrated and above described, wire from the reel is led through the tubular guide and the end is bent and disposed in one of the openings 55 in the link 53 of the chain. The clutch being disengaged from the clutch teeth 63 so that the shuttle remains stationary, the machine is started to cause the chain 47 to travel about the frame, thus drawing the wire under tension from the reel and eventually forming an annular core which rests in the groove 54. When the core is complete the end of the wire is disengaged from the opening in the link which has theretofore provided the necessary tension to advance the wire and the clutch is thrown into engagement, either manually or automatically, with the clutch teeth 63 to start rotation of the shuttle 57. The wire from the tubular guide 59 is thereby wound upon the core which is advanced at a rate timed with respect to the angular velocity of the shuttle to insure a proper pitch to the spiral convolutions. During this phase of the operation the tension of the wire on the chain 47 insures advancement of the grommet. The operation is continued until the desired number of convolutions have been laid upon the core. The clutch is then disengaged from the clutch teeth 63 while the chain 47 continues to advance until the grommet has made substantially one-half of a revolution. The machine is then brought to rest and the partially completed grommet is taken out. To facilitate removal, the shuttle 57 is provided with a removable section 64. A portion of the core of the grommet is then taken out by spreading the overlapping spirals and cutting the core wire, and the core is then completed by inserting the wire drawn from the reel in the preceding operation in place of the portion of the core which has been removed.

Figs. 10 to 15 inclusive illustrate another form of my invention employing a chain to advance a traveler about the frame of the machine in a circular path and across a gap between the ends of the frame. In this form of my invention a base plate 65 is supported on pillars 66 and is annular in form except for the narrow gap illustrated in Fig. 10. An annulus 66 mounted on the base plate provides inner and outer guides for a chain 67 comprising articulated links 68 and 69. The chain 67 travels over rollers 70 mounted on opposite sides of the gap of the base plate 65. At one side of the frame, idle sprockets 72 guide the chain 67 over a sprocket 73 on a shaft 74 which is adjustably mounted in the bracket 75 and may be driven from any suitable source of power, to advance the chain continuously about the external and internal peripheries of the annulus 66.

Figure 10:
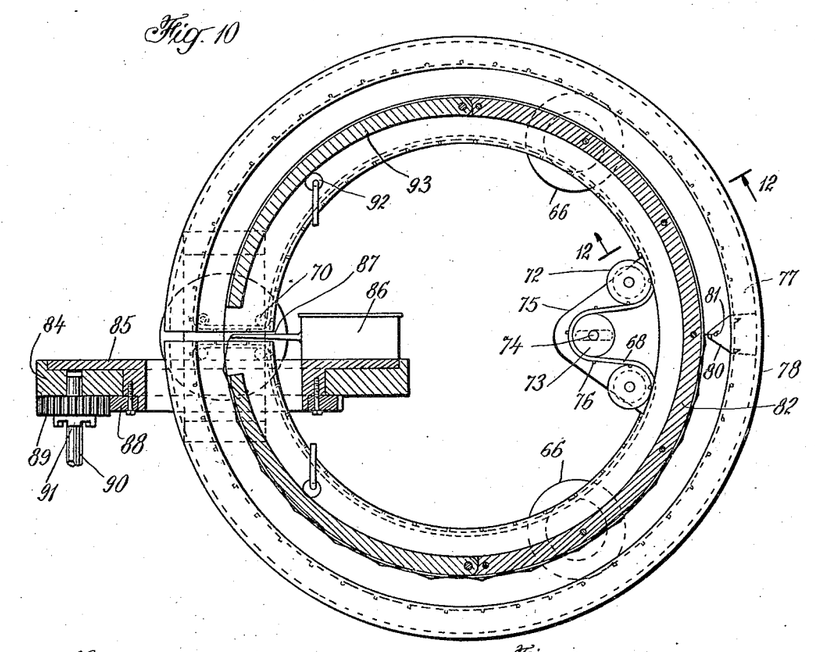
Fig. 10 is a view corresponding to Figs. 1 and 5 and illustrating a further modification.

Each of the links 69 is provided with a lug 76 which is adapted to engage a corresponding slot in a traveler 77. The traveler 77 is guided by a flange 78 on the base plate 65 and is held in place by a cover 79. A projecting arm 80 on the traveler 77 carries a pin 81 to which the end of the wire from which the grommet is to be formed may be secured, and preferably projects to a point closely adjacent an annular support 82 having a groove 83 to receive the grommet so that the arm forms a guide for the wire.

Figure 11:
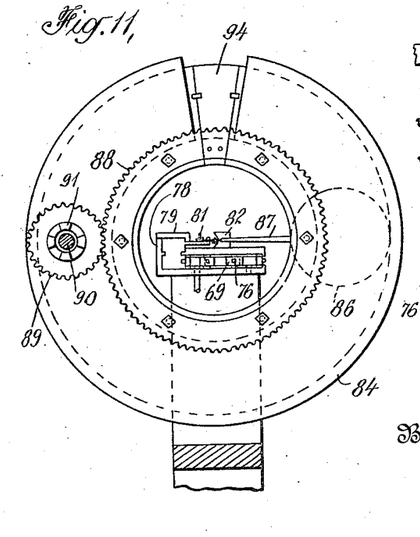
Fig. 11 is a view of the shuttle shown in Fig. 10.
Figure 12:
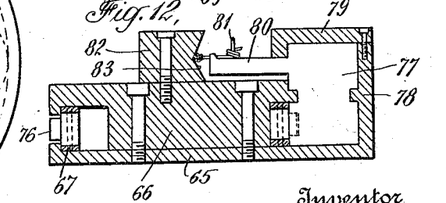
Fig. 12 is a sectional detail view on line 12—12 of Fig. 10.
Figures 13, 14, 15:
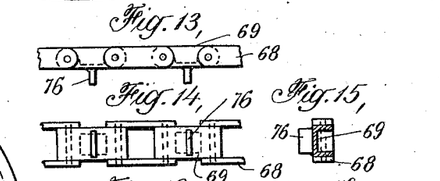
Figs. 13, 14 and 15 are detail views of the chain embodied in the construction shown in Fig. 10.

Adjacent the gap in the base place 65 I provide a ring 84 forming a support for an annular shuttle 85 carrying a reel 86 from which wire is delivered through a tubular guide 87. The shuttle 85 also carries a gear 88 meshing with a pinion 89 which is loosely supported on a shaft 90 having a bearing in the ring 84. Clutch teeth 91 on the pinion 89 are adapted to be engaged by a clutch (not shown) splined to the shaft and adapted to be moved toward and from the clutch teeth 91.

In forming a grommet in the machine last illustrated and described, the end of the wire projecting through the tubular guide 87 is connected to the pin 81 and the clutch being disengaged from the clutch teeth 91, the machine is started and the traveler is caused to advance about the frame until it has made a single revolution. The traveler is provided with two spaced notches adapted to be engaged by lugs 76 on the chain and as the traveler crosses the gap, these notches are successively disengaged from the lugs of the chain as it passes to the interior periphery of the frame while corresponding lugs on the portion of the chain which is returning to the exterior periphery pick up the traveler so that it is continuously advanced. At the conclusion of a single revolution of the traveler, the clutch is thrown, either manually or automatically, into engagement with the teeth 91 and the shuttle is thereby rotated so that wire from the distributor tube 87 is thereafter laid in spiral convolutions upon the core which was formed in the primary phase of the operation. The angular speed of the shuttle is adjusted with respect to the advance of the carrier so that the pitch of the spiral convolutions is such as to permit laying the desired number of convolutions upon the core. After the traveler has made the desired number of complete excursions about its circular path, the clutch is disengaged from the clutch teeth 91 while the traveler continues during substantially one-half of a revolution when the machine is stopped. The grommet is then released from the machine by turning eccentrics 92 which are supported on the base plate and hold hinged sections 93 of the support 82 in operative position. The shuttle 85 and gear 88 are formed with a removal section 94 which permits withdrawal of the grommet. As in the preceding embodiments of the invention, the grommet is completed by spreading the overlapping spirals and cutting away a portion of the core, after which the free end of the wire last drawn from the reel is inserted between the spirals.

Figure 16:
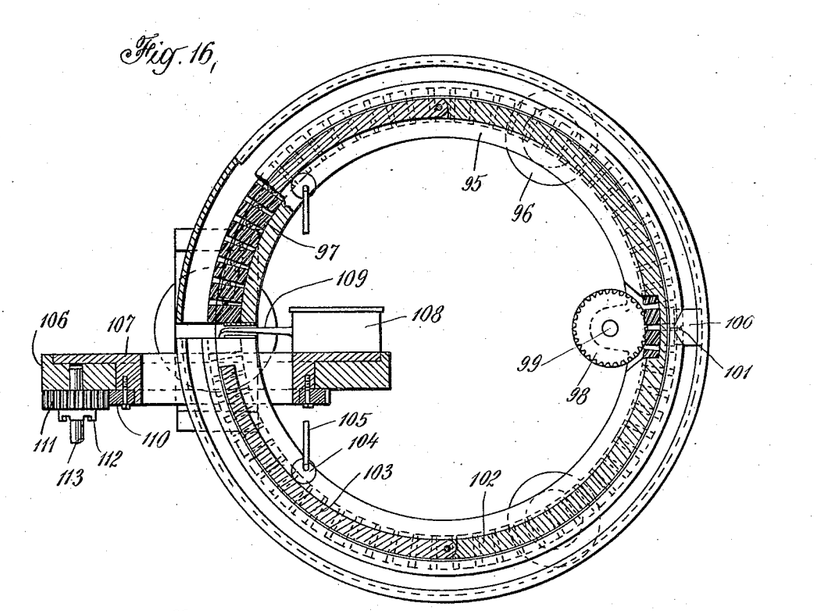
Fig. 16 is a view corresponding to Fig. 1 and illustrating a further modification.
Figure 17:
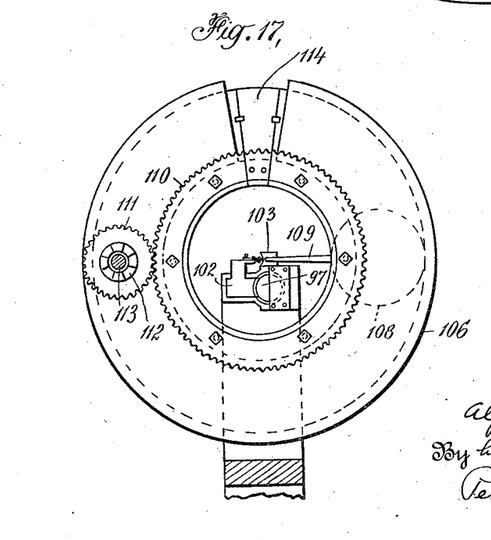
Fig. 17 is a view of the shuttle shown in Fig. 16.

In Figs. 16 and 17 a form of my invention is illustrated which embodies a worm disposed in the circle about a frame which is provided with a gap as in the preceding embodiments of the invention. The frame of the machine includes a base plate 95 mounted on pillars 96 and providing a housing for the worm consisting of a plurality of articulated sections 97 each having worm teeth formed on the periphery thereof. At one side of the base plate the worm meshes with a worm wheel 98 supported on a shaft 99 which may be driven from any suitable source of power. Thus the worm may be operated to actuate a traveler 100 which is provided with teeth meshing with the worm and carries a pin 101 to which the end of the wire from which the grommet is formed, may be secured. The base plate 95 is formed with a gap which is relatively narrow as compared with the traveler so that the traveler, upon reaching the gap, crosses and meshes with the teeth on the opposite end of the worm, and thus it may continue to move in a circular path as is required for the accomplishment of the desired object. A support 102 is provided on the base plate 97 to receive the wire during the formation of the grommet and to support it while the spiral convolutions are laid thereon. The support is preferably provided with pivoted ends 103 which are held in operative position by eccentrics 104 having handles 105 whereby the pivoted ends are released to permit removal of the grommet from the machine. Adjacent the gap, a ring 106 supports a shuttle 107 carrying a reel 108 from which wire is withdrawn through a tubular guide 109. A gear 110 secured to the shuttle 107 meshes with a pinion 111 which is provided with clutch teeth 112 and is loosely mounted on a shaft 113. The shaft 113 has a bearing in the ring 106 and carries a clutch (not shown), similar to the clutch 35 illustrated in Fig. 1, which may be moved into and out of engagement by the clutch teeth 112.

In forming a grommet in this machine, the end of the wire projecting from the tubular guide 109 is secured to the pin 110 and while the shuttle remains stationary, the worm wheel 98 is actuated to drive the worm, and consequently advance the traveler about the frame. At the conclusion of the first revolution of the traveler, a core has been laid on the support 102 and the clutch is then thrown into engagement with the clutch teeth 112 to start the revolution of the shuttle. Thereafter the wire is withdrawn from the distributor tube 109 and laid in spiral convolutions upon the core until the required number of convolutions have been formed. The shuttle is then stopped and the traveler is caused to advance through substantially one-half of a revolution. The grommet is now removed from the machine by releasing the pivoted sections 103 of the support and removing a section 114 of the shuttle 107. A portion of the core of the grommet is then taken out by spreading the overlapping spirals and cutting the core; and the free end of the wire last withdrawn from the wheel is inserted in place of the removed section of the core, thus completing the grommet.

From the foregoing it will be apparent that I have provided a machine, of which I have illustrated several embodiments, for forming grommets by withdrawing wire under tension from the reel and forming, first, a core and then, a plurality of spiral convolutions on the core. These machines are characterized by the provision of a traveler moving in a circle corresponding to the size of the grommet to be formed, and possess many advantages in simplicity of construction and facility of operation which render them highly desirable as a means for constructing grommets in a rapid and efficient manner.

The forms of my invention herein described are to be taken as illustrative of possible variations in structure whereby the same result may be accomplished. It is to be understood, therefore, that I contemplate claiming as my invention, a machine characterized by the provision of a traveler and that various changes may be made in the form, arrangement and construction of the parts without departing from the invention or sacrificing any of its numerous advantages.

I claim:

1. The method of making grommets from a single piece of wire, which consists in applying a force to the end of the wire to carry it along a circular path to form the core of the grommet, and to rotate the latter about its axis, and laying a plurality of convolutions of the wire spirally about said core as the latter is rotated.

2. In a machine for making grommets, a leader having means for securing the end of a piece of wire thereto, means for causing said leader to move in a circular path whereby to lay a convolution of wire to form the core of the grommet, and devices for then laying the wire upon said core in a plurality of convolutions of spirals arranged side by side to form the casing of the grommet.

3. In a machine for making grommets, a traveler, a leader carried by said traveler and providing means for securing the end of a piece of wire thereto, means for causing said traveler to move in a circular path whereby to lay a single convolution of wire to form the core of the grommet, feeding devices for the wire including a shuttle for laying the wire upon said core in a plurality of convolutions of spirals arranged side by side to form the casing of the grommet, said wire being laid under the tension set up therein between said leader and said feeding devices.

4. In a machine for making grommets, a circular frame to support the grommet and having a gap therein, a rotating shuttle, adjacent said gap, carrying wire feeding devices including a reel, means traveling substantially in a circle for gripping the end of the wire to lay a convolution thereof to form the core of the grommet, and means for rotating said shuttle to lay a plurality of convolutions of the wire upon said core while the latter is being rotated about its axis by said traveling means, and under the tension set up between the latter and said wire feeding devices.

5. A machine for making grommets, comprising a circular frame to support the grommet and having a gap therein, a rotating shuttle carrying a wire reel adjacent said gap, a traveler on said frame to which the end of the wire is secured, means for advancing said traveler about said frame and across said gap and means for rotating said shuttle to lay the wire spirally upon a core which is formed therefrom during the first revolution of said traveler.

6. A machine for making grommets, comprising a circular frame to support the grommet and having a gap therein, a rotating shuttle carrying a wire reel adjacent said gap, a traveler on said frame having means thereon to which the end of the wire is secured, means for advancing said traveler about the frame and across the gap and means for rotating said shuttle to lay the wire spirally upon a core which is formed therefrom during the first revolution of said traveler, the movement of the traveler across the gap being timed with respect to the shuttle to prevent interference therewith.

7. A machine for making grommets, comprising a circular frame to support the grommet and having a gap therein, a rotating shuttle carrying a wire reel adjacent said gap, a traveler on said frame having means thereon to which the end of the wire is secured, means for advancing said traveler about said frame including a pair of oscillating rings each having a gap corresponding to the gap in said frame, complementary means on said traveler and rings whereby said traveler is alternately actuated thereby, means for actuating said rings and means for rotating said shuttle to lay the wire spirally upon a core which is formed therefrom during the first revolution of said traveler.

8. A machine for making grommets, comprising a combination of a support of circular form, mechanical means for gripping the end of a piece of wire and carrying it around the support to lay a core thereon, and means for rotating the supply of wire about the core while continuing the movement of the end of the wire around the support to wind convolutions of spirals upon the core.

9. A machine for making grommets, comprising the combination of a support of circular form, a traveler, means for moving the traveler around the circular support, a support for a supply of wire whose end is secured to the traveler, and means for rotating the supply of wire about a core of wire upon the support.

10. A machine for making grommets, comprising the combination of a support which is a complete annulus except for one gap therein, a rotary member mounted at said gap and supporting a supply of wire, a traveler on said support to which the end of the wire is secured and means for rotating said member about a core on said support and for causing said traveler to move around upon the support.

11. A machine for making grommets, comprising the combination of a support which is a complete annulus except for one gap therein, a rotary member mounted at said gap and supporting a supply of wire, a traveler on said support to which the end of the wire is secured, means for moving the traveler around upon the support and across the gap therein to lay a core upon the support, and means for rotating said member to carry the supply of wire around the core, the traveler when moving across said gap being in the path of movement of a part of said rotary member.

In testimony whereof I affix my signature.

ALPHONSO COMSTOCK PRATT.